United States Patent Office 3,017,949
Patented Jan. 23, 1962

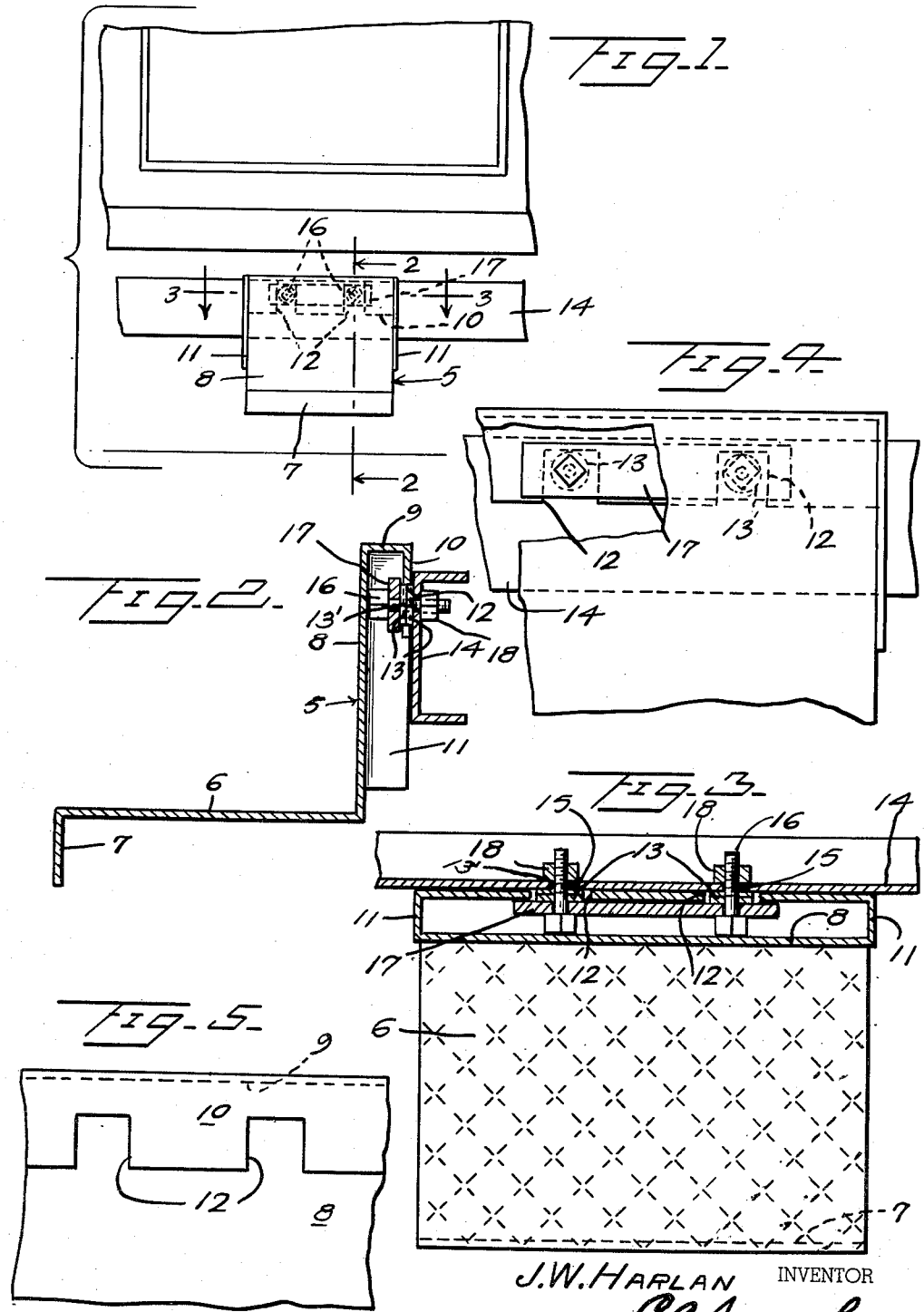

3,017,949
REMOVABLE BUMPER SUPPORTED STEP FOR TRUCK BODIES
J. Way Harlan, 5134 Saratoga Ave., San Diego, Calif.
Filed July 29, 1960, Ser. No. 46,305
3 Claims. (Cl. 182—92)

By way of explanation, it might be stated that frequently motor pick-up trucks are converted for camping purposes, and since the bodies of such trucks are elevated appreciable distances above the ground surface, difficulty has been experienced in climbing into and out of the trucks, under existing conditions.

It is therefore the primary object of the present invention to provide a removable step with means for detachably mounting the step on the rear bumper of the truck adjacent to the entrance opening of the converted truck body, for the convenience of persons entering or passing from the truck body.

An important object of the invention is to provide a detachable step of this character which may be readily and easily mounted on the bumper by persons unfamiliar with mechanics, and one which when out of use, will require little space for storage.

Still another object of the invention is to provide a bumper which is so constructed that it will be securely and safely held in place against accidental movement or displacement while in use.

With the foregoing and other objects in view which will appear as the description proceeds. the invention consists of certain novel details of construction and combinations of parts, hereinafter more fully described and pointed out in the claims, it being understood that changes may be made in the construction and arrangement of parts without departing from the spirit of the invention as claimed.

Referring to the drawing:

FIGURE 1 is a fragmental elevational view illustrating a vehicle bumper as equipped with a detachable step, constructed in accordance with the invention.

FIGURE 2 is a sectional view taken on line 2—2 of FIGURE 1.

FIGURE 3 is a sectional view taken on line 3—3 of FIGURE 1.

FIGURE 4 is a fragmental enlarged elevational view illustrating the attaching means of the step as connected with the bumper.

FIGURE 5 is a rear elevational view of a fragment of the removable step, in an enlarged showing.

Referring to the drawing in detail, a step constructed in accordance with the present invention is indicated generally by the reference character 5 and is constructed preferably of a length of sheet metal material which is of a thickness to withstand the strain under which the same will be subjected while in use.

The tread portion of the step is indicated by the reference character 6, the forward marginal edge thereof being extended downwardly providing a reinforcing or stabilizing flange 7 lending rigidity to the step proper.

The body portion of the step also includes a vertical section 8 formed integral with the rear edge of the tread of the step 5, the upper edge of the vertical portion 8 extending rearwardly at 9 terminating in a downwardly extended flange 10 disposed in spaced relation with the vertical portion 8, as better shown by FIGURE 2 of the drawing.

Side edges of the vertical portion 8 are extended rearwardly providing flanges 11 that brace the vertical portion 8 throughout substantially the entire length of the vertical portion 8.

Formed in the lower edge of the downwardly extended flange 10, are spaced openings 12 which are substantially wide to receive the spacers 13, which may be in the form of washers.

The reference character 14 indicates the rear bumper of a truck, which is formed with bolt openings 15 through which the bolts 16 extend, the bolts also passing through a securing plate 17 which is provided with openings that register with the openings 13' of the rear bumper, when properly placed to receive the bolts 16. Nuts 18 are provided on the threaded ends of the bolts 16 which nuts when tightened, securely hold the step against accidental dislodgement, but at the same time provide means whereby loosening the nut the step may be readily removed, the bolts remaining in the openings of the bumper for future use when it is desired to remount the step.

From the foregoing it will be seen that due to the construction shown and described, I have provided a detachable step for use with truck bodies wherein the truck bodies are elevated to such positions that entering or passing from the truck under normal conditions, are obviated.

Having thus described the invention, what is claimed is:

1. A detachable step for attachment to a vehicle bumper having spaced openings, comprising a substantially rectangular plate constructed to provide a tread portion, a depending flange integral with and disposed along one edge of said rectangular plate, an integral vertical supporting portion disposed along the opposite edge and terminating in a rearwardly and downwardly extending flange, said flange having wall portions defining openings therein adapted to be aligned with the spaced openings in said bumper, integral rearwardly extending portions formed along each edge of said vertical supporting member and in contact with said bumper to prevent downward displacement of said step.

2. A detachable step for attachment to a vehicle bumper as defined in claim 1 wherein said rearwardly and downwardly extending flange provides an integral bracket in parallel spaced relation with respect to said integral vertical supporting portion, the openings in said flange extending inwardly from an edge thereof and bolts extending through the spaced openings in said bumper and the openings in said flange to detachably secure said step to said bumper.

3. A detachable step for attachment to a vehicle bumper as defined in claim 2 which further includes an elongated substantially rectangular clamp member disposed within the space defined by said vertical supporting portion and rearwardly and downwardly extending flange, said clamp member having wall portions defining openings therein adapted to be aligned with the openings in said flange and said bumper, said bolts extending through the opening in said bumper, flange and clamp member whereby said step is secured to said bumper by the clamping engagement of said clamp member and said bumper on opposite sides of said flange.

References Cited in the file of this patent
UNITED STATES PATENTS

| | | |
|---|---|---|
| 706,870 | Wood | Aug. 12, 1902 |
| 1,588,566 | Wismer | June 15, 1926 |
| 2,463,295 | Morr | Mar. 1, 1949 |
| 2,762,595 | Jenne | Sept. 11, 1956 |
| 2,817,566 | Herman | Oct. 26, 1956 |